US012759939B2

(12) United States Patent
Lauren et al.

(10) Patent No.: US 12,759,939 B2
(45) Date of Patent: Oct. 13, 2026

(54) HYDRAULIC BINDER FOR MORTAR COMPOSITION

(71) Applicant: SAINT-GOBAIN WEBER FRANCE, Sucy-en-Brie (FR)

(72) Inventors: Gunnar Lauren, Pargas (FI); Yannick Sallier, Nogent-sur-Marne (FR)

(73) Assignee: SAINT-GOBAIN WEBER FRANCE, Sucy-en-Brie (FR)

( * ) Notice: Subject to any disclaimer, the term of this patent is extended or adjusted under 35 U.S.C. 154(b) by 303 days.

(21) Appl. No.: 18/553,815

(22) PCT Filed: Apr. 4, 2022

(86) PCT No.: PCT/FR2022/050627
§ 371 (c)(1),
(2) Date: Oct. 3, 2023

(87) PCT Pub. No.: WO2022/214759
PCT Pub. Date: Oct. 13, 2022

(65) Prior Publication Data

US 2024/0190772 A1 Jun. 13, 2024

(30) Foreign Application Priority Data

Apr. 9, 2021 (FR) ....................................... 2103680

(51) Int. Cl.
*C04B 28/16* (2006.01)
*C04B 111/00* (2006.01)
*C04B 111/60* (2006.01)

(52) U.S. Cl.
CPC ..... *C04B 28/16* (2013.01); *C04B 2111/00482* (2013.01); *C04B 2111/60* (2013.01)

(58) Field of Classification Search
CPC ........... C04B 28/16; C04B 2111/00482; C04B 2111/60; C04B 28/14; C04B 18/142; C04B 20/008; C04B 7/02; C04B 7/12; C04B 7/32; C04B 7/323; C04B 7/3453; C04B 2103/0088; C04B 14/20; C04B 14/28; C04B 18/08; C04B 18/146; C04B 24/26; C04B 2103/0079; C04B 2103/10; C04B 2103/20; C04B 2103/304; C04B 2103/40; C04B 2103/44; C04B 2103/46; C04B 2103/54; C04B 2103/67; Y02W 30/91
See application file for complete search history.

(56) References Cited

U.S. PATENT DOCUMENTS

| | | | | |
|---|---|---|---|---|
| 5,030,289 | A * | 7/1991 | Sattler | C04B 28/14 106/711 |
| 2017/0260096 | A1* | 9/2017 | Sahu | C04B 40/0039 |
| 2020/0087207 | A1 | 3/2020 | Shao et al. | |
| 2021/0206696 | A1 | 7/2021 | Mahoutian | |

FOREIGN PATENT DOCUMENTS

| | | | |
|---|---|---|---|
| CN | 111620590 | A | 9/2020 |
| CN | 111646712 | A | 9/2020 |
| CN | 111689701 | A | 9/2020 |
| EP | 2 080 742 | A2 | 7/2009 |
| JP | H06-321607 | A | 11/1994 |
| KR | 10-2010-0064765 | A | 6/2010 |
| WO | WO 2018/102931 | A1 | 6/2018 |
| WO | WO 2020/206540 | A1 | 10/2020 |

OTHER PUBLICATIONS

The Influence of Steel Slag with Variable Particle Size Distribution on the Workability and Mechanical Properties of Concrete Ceramics-Silikaty 63 (1) 67-75 (2019) by Jun Zang Weifeng Li Xiaodong Shen (Year: 2019).*
Ladle slag cement-Characterization of hydration and Conversion by Adesanya, Sreenivasan, Kantola, Telkki, Ohenoja, Kinnunen and Illikainen Construction and Building Materials 193 (2018) 128-134 (Year: 2018).*
Influence of Steel slag with Variable Particle Size distribution on Workability and Mechanical Properties of concrete Jun Zang Weifeng Li xiaodong Shen Cermics-Silikaty 63 (1) 67-75 (Year: 2019).*
Third Party Observation as filed in European Patent Application No. 22718756.4, dated Sep. 2, 2025.
Adesanya, E. D. "A Cementitious Binder From High-Alumina Slag Generated in the Steelmaking Process," Phd thesis, University of Oulu, Acta Univ. Oul. C 727, 2019, ISBN 978-952-62-2451-0 (Paperback) (Year: 2019).
Nguyen, H., et al., "Ettringite-based binder from ladle slag and gypsum—The effect of citric acid on fresh and hardened state properties," Cement and Concrete Research 123, (Year: 2019).
First Office Action as issued in Chinese Patent Application No. 202280027166.5, dated Nov. 26, 2025.
International Search Report as issued in International Patent Application No. PCT/FR2022/050627, dated Jul. 11, 2022.
Office Action as issued in Brazilian Patent Application No. BR112023019297-8, dated Feb. 24, 2026.

* cited by examiner

*Primary Examiner* — Pamela H Weiss
(74) *Attorney, Agent, or Firm* — CUSHMAN PARTNERS LLC

(57) ABSTRACT

A hydraulic binder for a mortar composition includes at least one ladle slag having a particle size distribution by volume such that the D50 is less than 40 μm.

20 Claims, No Drawings

HYDRAULIC BINDER FOR MORTAR COMPOSITION

CROSS-REFERENCE TO RELATED APPLICATIONS

This application is the U.S. National Stage of PCT/FR2022/050627, filed Apr. 4, 2022, which in turn claims priority to French patent application number 2103680 filed Apr. 9, 2021. The content of these applications are incorporated herein by reference in their entireties.

The present invention relates to a hydraulic binder for a mortar composition based on a by-product of the industry, on a mortar composition comprising said binder, as well as on floor products or fast-setting mortars or techniques obtained from such a composition.

Many mortar compositions used in the field of construction use cements of the aluminous type (also known by the abbreviation CAC for "calcium aluminate cements") or sulfoaluminate (or also known by the abbreviation CSA for "calcium sulfoaluminate cements"). These types of CAC cements have been developed for many years and their use is currently widespread. Indeed, these cements make it possible in particular to shorten the setting times and therefore to accelerate the hardening of the composition but also to control the dimensional variations during hardening or also to reinforce mechanical strength. Thus, aluminous or sulfoaluminate cements are used in a mixture with Portland cements to achieve rapid setting. The accelerating power of the binary system depends on the CAC/OPC ratio. It is also known that aluminous or sulfoaluminate cements are used in a mixture with sources of calcium sulfate and optionally Portland cement to control the dimensional variations or else to obtain rapid endogenous hardening.

One of the current concerns remains to significantly reduce the carbon footprint of the products for construction. The processes for manufacturing clinker require operations of decarbonation, calcination, and clinkerization by heating, in particular at very high temperatures on the order of 1450° C. Aluminous and Portland cements are for example at the origin of emissions of about 800 kg of $CO_2$ per ton of cement produced. They are also consumers of energy and natural resources.

An alternative solution to aluminous or sulfoaluminate cements would therefore have a potential benefit for manufacturers. It is within this context that the present invention is included, which proposes a hydraulic binder based on a by-product of industry, considered to be a by-product and thus rarely or never recycled until now. The method for preparing the by-product for use in construction materials generates a lower amount of $CO_2$ emissions and therefore makes it possible to improve the carbon balance.

The present invention relates to a hydraulic binder for a mortar composition, which comprises at least one ladle slag having a particle size distribution by volume such that the D50 is less than 40 μm.

Slag is a by-product of an industrial process involving the melting of a starting material, said melting being intended to separate metals from an oxide phase, the latter being called "slag".

Ladle slags are steel slags, resulting from the secondary metallurgy of steel. More specifically, the conversion steel (resulting from a cast steel converting the cast iron, in particular in an oxygen converter) or so-called electric steel (resulting from electric steel mill, in particular by the melting of scrap steel in an arc furnace) is poured into a ladle and transferred into an installation called "ladle furnace". Generally equipped with three graphite electrodes, the ladle furnace allows the desired shade to be made up by addition and deoxidation supplements and ensures that the temperature is maintained. Homogenization of liquid steel is ensured by gas stirring with argon or nitrogen. Ladle slag is the slag from the ladle furnace.

Ladle slags are distinguished, by their chemical and mineralogical composition, from other steel slags, namely blast furnace slag and other steel mill slags that are conversion steel slags (often called "LD slag") and electric steel slags. For example, the blast furnace slags used in hydraulic binders are generally amorphous (vitreous) since they were "granulated", that is to say cooled suddenly by watering. Ladle slags are also more basic than electric steel slags. However, it will be noted that the ladle slags have different chemical compositions and mineralogical compositions depending on their origin, depending in particular on the addition and deoxidation supplements used.

In order to make it reactive, the ladle slag is ground to obtain very fine particles. This grinding operation is to be taken into consideration to calculate the carbon footprint during the manufacture of the binder. However, if it is compared to the carbon footprint of a method for manufacturing an aluminous or sulfoaluminate cement, the grinding operation very greatly reduces $CO_2$ emissions.

The ladle slag used in the invention has a particle size distribution by volume such that the D50 is less than 40 μm, preferably less than 20 μm, and in particular between 8 and 15 μm. The D50 is the size such that 50% by volume of the particles have a size less than this D50 value. The particle size distribution by volume is preferably determined by laser granulometry (also called laser diffraction granulometry). This fineness of the particles makes it possible in particular to give the slag good reactivity, allowing it to be used in a mortar composition and to obtain the expected properties in terms of setting time and mechanical strength. The D90 is preferably less than 100 μm, especially less than 60 μm.

The inventors have been able to demonstrate that, surprisingly, such slag could, partially or totally, replace aluminous cements, while conferring the same properties of accelerated hardening of the composition, of controlling dimensional variations during the hardening, and of improving mechanical strength. These properties make it particularly advantageous to add such a binder into mortar compositions for floor products, in particular screeds, coatings, and quick-setting mortars.

Due to the complementary addition of lime or dolomite in the pouch, the ladle slag is very rich in lime. It is also rich in alumina.

In the present document, the elementary chemical compositions are given as equivalent mass % of oxide. For example, said substance contains X % alumina means that this substance contains the aluminum element in an amount equivalent to that provided by X % alumina; this does not necessarily mean that the substance contains alumina as a chemical compound or mineralogical constituent.

Ladle slag preferably has a chemical composition which comprises the following constituents within the limits hereunder expressed as percentages by weight:

$SiO_2$: 2-20%, particularly 5-15%, especially 7-12%,
CaO: 30-60%, particularly 40-55%
$Al_2O_3$: 15-50%, particularly 20-48%, or even 25-45%, particularly 30-40%.

Ladle slag may also comprise magnesia (MgO), in particular in a content of between 2 and 10%, or even between 3 and 8%.

In order not to negatively impact setting time, the iron oxide content in ladle slag is preferably less than 5% by weight, especially less than 3% by weight, and even less than 2% by weight.

The ladle slag is preferably crystallized at least 30%, in particular at least 50% or 60%, or even at least 70% or 75% by weight. The degree of crystallization can be evaluated by X-ray diffraction by the Rietveld method. The degree of crystallization will in particular depend on the rate of cooling of the slag, with a more slowly cooled slag developing more crystalline phases.

Particularly advantageously for the intended application, the ladle slag comprises at least one crystalline phase of calcium aluminate type (in particular of the type of $C_3A$ and/or $C_{12}A_7$, this latter phase being called mayenite, and/or $C_4AF$), in particular in a content by weight of at least 10%, or even at least 15% and even of at least 20%, in particular between 10 and 60%, or even between 30 and 55%.

Preferably, the ladle slag comprises both a phase $C_3A$ and a phase $C_{12}A_7$, in a total content by weight of at least 20%, in particular of at least 30%, in particular of between 35 and 60%.

The reactivity of the ladle slag is also improved if it further comprises crystalline phases of calcium silicate type (in particular of type $C_2S$ and/or $C_3S$). Preferably, the total content of crystalline phases of the calcium aluminate type is, however, greater than the total content of crystalline phases of the calcium silicate type.

The binder preferably comprises ladle slag and at least one of the following constituents:

- one or more cements selected from Portland cements, belite cements, aluminous or sulfoaluminate cements, cements of pozzolanic mixtures optionally comprising fly ash, silica fumes, limestone, calcined schist and/or natural or calcined pozzolans, and/or
- a source of calcium sulfate selected from plaster, hemihydrate, gypsum and/or anhydrite, alone or in a mixture.

The binder according to the present invention may be a binary binder, in the sense that it is the mixture of two constituents, or a ternary binder if it is a mixture of three constituents. The binder may also be more complex in its composition and comprise more than three different constituents, in particular four.

In a binary system comprising ladle slag and a cement, advantageously, the binder consists of ladle slag and Portland cement. Preferably, in a binary system of this type, the ladle slag content is less than 40% by weight, the remainder being Portland cement. Even more preferentially, the ladle slag content is less than 20% by weight. This limited amount of ladle slag makes it possible to maintain mechanical strengths compatible with the desired applications.

In a binary system consisting of ladle slag and a source of calcium sulfate, the ladle slag content may be higher. Such a system may comprise up to 90% by weight of ladle slag, in particular from 50 to 80%, or even from 60 to 75% by weight, of ladle slag, the remainder being calcium sulfate.

The binder may also advantageously be a ternary binder and consist of ladle slag, Portland cement and calcium sulfate. The relative proportions of each of the constituents can vary depending on the desired application for the mortar. For example, the binder may comprise between 10 and 50% by weight of Portland cement, between 30 and 70% by weight of ladle slag, and between 10 and 50% by weight of calcium sulfate.

The binder according to the present invention may optionally comprise aluminous or sulfoaluminate cement. The binder is then a quaternary binder consisting of ladle slag, Portland cement, aluminous cement and calcium sulfate. In this type of binder, the ladle slag partially substitutes for the aluminous cement.

In a particularly preferred manner, the binder according to the invention comprises (or even consists of), by weight:

- from 5 to 80%, in particular from 10 to 70%, or even from 30 to 60% of ladle slag,
- from 0 to 50%, in particular from 2 to 35%, or even from 5 to 30% of Portland cement,
- from 1 to 50%, in particular from 5 to 45%, or even from 15 to 35% of calcium sulfate, and
- from 0 to 60%, in particular from 2 to 35%, or even from 5 to 20% of aluminous cement. Such a binder is in particular suitable for floor products.

Thus, very advantageously, the binder comprises or consists, by weight, from 5 to 80% of ladle slag, from 0 to 50% of Portland cement, from 1 to 50% of calcium sulfate and from 0 to 60% of aluminous cement. Even more advantageously, the binder comprises or consists of, by weight, from 10 to 70% of ladle slag, from 2 to 35% of Portland cement, from 5 to 45% of calcium sulfate and from 2 to 35% of aluminous cement.

The present invention also relates to a dry mortar composition comprising a binder according to the invention and aggregates.

The composition is called dry since the majority, or even all, of these constituents are in powder form. The percentages of each of the constituents are given as mass percentages relative to the totality of the components of said composition.

The aggregates generally used in mortar compositions have a diameter of less than 8 mm, preferably less than 4 mm, or even less than 3 mm, which distinguishes the mortar compositions from concrete compositions, which contain coarse aggregates. The aggregates are mineral grains, in particular stone grains, gravel, pebbles, stones and/or sands. The aggregates may comprise fillers, which are finely ground inert mineral materials, generally of the calcareous or siliceous type. Preferably, the aggregates comprise sands and/or fillers, but not gravel or aggregates. The total content of aggregates is preferably between 40 and 90% by weight relative to the dry mortar composition.

According to one example, the mortar composition according to the present invention comprises a binary hydraulic binder which is a mixture of ladle slag and Portland cement.

It may also comprise a ternary hydraulic binder which is the mixture of ladle slag and of two other binders selected from:

- a cement selected from Portland cements, belite cements, aluminous or sulfoaluminate cements, cements of pozzolanic mixtures optionally comprising fly ash, silica fumes, limestone, calcined schist and/or natural or calcined pozzolans, alone or in a mixture, and/or
- a source of calcium sulfate selected from plaster, hemihydrate, gypsum and/or anhydrite, alone or in a mixture.

Preferably, the mortar composition according to the present invention comprises a ternary hydraulic binder which is the mixture of ladle slag, Portland cement and a source of calcium sulfate, in particular chosen from plaster, hemihydrate, gypsum and/or anhydrite, alone or in a mixture.

The mortar composition may further comprise aluminous or sulfoaluminate cement. The mortar composition can thus comprise a quaternary hydraulic binder which is the mixture of ladle slag, Portland cement, aluminous cement and a source of calcium sulfate.

The binder according to the invention preferably represents between 10 and 60% by weight of the dry composition of mortar (therefore of the total dry mixture of the various powder constituents), as a function of the use chosen for the composition.

Particularly preferably, the mortar composition comprises (by weight) from 0 to 7%, in particular from 3 to 6%, of Portland cement, from 1 to 35%, in particular from 8 to 15%, of ladle slag, from 1 to 15%, in particular from 5 to 10% of calcium sulfate, from 0 to 5%, in particular from 1 to 4% of aluminous cement, and from 40 to 90% of aggregates. Such mortar compositions are particularly advantageous for floor products.

The mortar composition according to the present invention may comprise an activator chosen from activators known for their use in compositions for mortars based on ternary binders or cements.

The composition may also comprise, in addition, one or more additives, chosen from rheological agents, water-retaining agents, air-entraining agents, thickeners, biocidal protecting agents, dispersants, pigments, accelerators and/or retarders, polymeric resins, anti-foaming agents. The total content of additives and adjuvants varies preferably between 0.001 and 5% by weight relative to the total weight of the dry composition.

The presence of these various additives, in particular but not exclusively, makes it possible to adapt the setting time or the rheology of the wet mortar composition, that is to say after mixing with water, so as to meet the expectations based on the desired product.

The present invention also relates to floor products such as coatings or screeds, and also to technical mortars (in particular repair mortars) capable of being obtained by mixing with water of the dry mortar composition. The binder according to the invention is also particularly advantageous in the case of rapid-setting mortars, in particular jointing mortars or adhesive mortars. These floor products are traditionally obtained by curing in air and at room temperature of the mortar obtained after mixing. For example, the screeds or floor coatings are obtained by mixing the dry composition of mortar with water, then by pouring onto a substrate the liquid obtained so as to obtain a layer that is then allowed to cure in air and at room temperature.

By way of example, for a self-leveling floor compound, the start of setting is generally less than 2 hours. The spreading values of the wet composition must generally be greater than 200 mm when they are measured at 2 minutes. The spreading value is determined using a ring having a height of 35 mm and a diameter of 68 mm.

The product obtained after drying and hardening of the wet mortar composition which may be a floor coating or a screed must meet certain mechanical characteristics. For example, as regards France, the flexural strength of these products must in particular be greater than 4 MPa after 28 days, and the compressive strength must be greater than 18 MPa after 28 days for class P3.

For floor applications, it is also important for shrinkage during the drying of the wet composition to be controlled. This shrinkage is generally less than 1 mm/m.

The examples which follow show the invention without limiting the scope thereof.

Table 1 below shows the composition of mortars for floor products tested (in mass %) as well as the properties obtained.

In this table, OPC refers to Portland cement of the CEM I type, CAC 1 and CAC 2 are two types of aluminous cement (respectively referred to by the trade names HiPerCem and Ciment Fondu), and calcium sulfate is a mixture of anhydrite and hemihydrate.

The ladle slag had the following weight composition: 8.8% $SiO_2$, 31.5% $Al_2O_3$, 49.4% CaO, 6.4% MgO, 1.1% $TiO_2$, 1.1% $Fe_2O_3$ and 1.7% impurities. The slag was very predominantly crystallized, and contained 30% phase $C_{12}A_7$ (mayenite), 16% phase $C_3A$ and 16% $C_2S$ phases. Its D50, determined by laser granulometry, was 9.8 μm and the D90 of about 42 μm.

Comparative example $C_1$ uses aluminous cement, but no ladle slag.

The table indicates the spreading at 2 minutes, measured according to the method measured above, the start and end of setting, determined by the Vicat test, the bending and compression resistances at 1, 7 and 28 days, measured according to the EN 13892-2 standard, and the shrinkage at 28 days, measured according to the standard EN13872 standard.

TABLE 1

| | C1 | 1 | 2 | 3 | 4 |
|---|---|---|---|---|---|
| OPC | 5.5 | 5.5 | 3.5 | 5.5 | 1 |
| CAC 1 | 13 | 2 | 2 | — | — |
| CAC 2 | — | — | — | 1 | 1 |
| Ladle slag | — | 10 | 10 | 10 | 8 |
| Ca Sulphate | 6.9 | 6.9 | 6.9 | 6.9 | 6.9 |
| Aggregates | 72 | 73 | 75 | 74 | 80.5 |
| Additives | 2.6 | 2.6 | 2.6 | 2.6 | 2.6 |
| Water | 20% | 20% | 20% | 20% | 20% |
| Spreading (2 min)—mm | 221 | 200 | 200 | 212 | — |
| Start of setting—min | 60 | 90 | 85 | 90 | 53 |
| End of setting—min | 70 | 95 | 90 | 95 | — |
| Bending 1 d—MPa | 3.9 | 3.6 | 3.4 | 3.1 | 2.8 |
| Bending 7 d—MPa | 7.7 | 6.6 | 6.4 | 5.4 | 4.9 |
| Bending 28 d—MPa | 10.0 | 8.5 | 8.1 | 7.7 | 5.8 |
| Compression 1 d—MPa | 16.2 | 14.9 | 13.0 | 13.8 | 12.2 |
| Compression 7 d—MPa | 27.1 | 27.8 | 28.1 | 25.7 | 25.6 |
| Compression 28 d—MPa | 37.1 | 31.4 | 34.1 | 34.4 | 28.9 |
| Shrinkage 28 d—mm/m | −0.5 | −0.3 | −0.3 | −0.4 | −0.2 |

These results show that the substitution of aluminous cement with ladle slag makes it possible to obtain particularly high-performance floor products.

The invention claimed is:

1. A hydraulic binder for a mortar composition comprising, by weight, from 10 to 70% of at least one ladle slag, from 0 to 35% of Portland cement, from 5 to 45% of calcium sulfate and from 2 to 35% of aluminous cement, the at least one ladle slag having a particle size distribution by volume such that the D50 is less than 40 μm, wherein the ladle slag has a chemical composition which comprises the following constituents within the limits hereunder expressed as percentages by weight:

$SiO_2$: 2-20%,

CaO: 30-60%

$Al_2O_3$: 20-50%, and wherein the ladle slag comprises at least one crystalline phase of calcium aluminate type in a content by weight of between 10 and 60%.

2. The binder according to claim 1, wherein the at least one crystalline phase of the calcium aluminate type is of C3A or C12A7 type.

3. The binder according to claim 2, wherein the D50 of the ladle slag is less than 20 μm.

4. The binder according to claim 1, comprising said ladle slag and at least one of the following constituents:

one or more cements selected from Portland cements, belite cements, aluminous or sulfoaluminate cements, cements of pozzolanic mixtures optionally comprising fly ash, silica fumes, limestone, calcined schist and/or natural or calcined pozzolans, and/or a source of calcium sulfate selected from plaster, hemihydrate, gypsum and/or anhydrite, alone or in a mixture.

5. The binder according to claim 1, which comprises or consists of, by weight, from 10 to 70% of ladle slag, from 2 to 35% of Portland cement, from 5 to 45% of calcium sulfate and from 2 to 35% of aluminous cement.

6. A dry mortar composition comprising a binder according to claim 1, and aggregates.

7. The dry mortar composition according to claim 6, wherein the aggregates have a diameter of less than 8 mm.

8. The dry mortar composition according to claim 6, comprising by weight from 0 to 7% of Portland cement, from 1 to 35% of ladle slag, from 1 to 15% of calcium sulfate, from 0 to 5% of aluminous cement and from 40 to 90% of aggregates.

9. The dry mortar composition according to claim 8, comprising by weight from 3 to 6% of Portland cement, from 8 to 15% of ladle slag, from 5 to 10% of calcium sulfate, from 1 to 4% of aluminous cement and from 40 to 90% of aggregates.

10. The dry mortar composition according to claim 6, comprising one or more additives, chosen from rheological agents, water-retaining agents, air-entraining agents, thickeners, biocidal protecting agents, dispersants, pigments, accelerators and/or retarders, polymeric resins.

11. A floor product or technical mortar, capable of being obtained by mixing with water of the dry mortar composition according to claim 6.

12. The floor product according to claim 11, which is a screed or a floor coating.

13. The binder according to claim 1, wherein the ladle slag has a chemical composition which comprises the following constituents within the limits hereunder expressed as percentages by weight:

$SiO_2$: 7-12%,

CaO: 40-55%

$Al_2O_3$: 25-45%.

14. The binder according to claim 3, wherein the D50 of the ladle slag is between 8 and 15 μm.

15. The dry mortar composition according to claim 6, comprising between 10 and 60% by weight of binder.

16. The dry mortar composition according to claim 7, wherein the aggregates have a diameter of less than 4 mm.

17. The floor product according to claim 11, wherein the floor product is floor product a coating or screed.

18. The binder according to claim 1, wherein the ladle slag is crystallized at least 30% by weight.

19. The binder according to claim 1, wherein the ladle slag has an iron oxide content of less than 5% by weight.

20. The binder according to claim 1, wherein the ladle slag comprises a phase $C_3A$ and a phase $C_{12}A_7$ in a total content by weight of at least 20%.

* * * * *